United States Patent
Baumeister et al.

(10) Patent No.: US 6,859,142 B2
(45) Date of Patent: Feb. 22, 2005

(54) METHOD AND DEVICE FOR THEFT PROTECTION OF ELECTRONIC APPARATUS CONNECTED TO A BUS SYSTEM

(75) Inventors: Markus Baumeister, Aachen (DE); Heribert Baldus, Aachen (DE); Thomas Falck, Aachen (DE); Steffen Hauptmann, Aachen (DE); Joachim Kahlert, Aachen (DE); Andras Montvay, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/216,411

(22) Filed: Aug. 9, 2002

(65) Prior Publication Data

US 2003/0034890 A1 Feb. 20, 2003

(30) Foreign Application Priority Data

Aug. 14, 2001 (DE) .......................... 101 39 922

(51) Int. Cl.$^7$ .............................. G08B 13/14
(52) U.S. Cl. ................ 340/568.1; 340/541; 340/572.1; 713/200
(58) Field of Search .......................... 340/568.1, 568.2, 340/541, 572.1, 524; 713/200, 201; 709/220–226; 370/254, 257, 285

(56) References Cited

U.S. PATENT DOCUMENTS

| | | | | |
|---|---|---|---|---|
| 4,121,201 A | * | 10/1978 | Weathers .................... 340/524 |
| 4,654,640 A | * | 3/1987 | Carll et al. .................. 340/568 |
| 4,736,195 A | * | 4/1988 | McMurtry et al. ........ 340/568.3 |
| 5,034,723 A | * | 7/1991 | Maman .................... 340/568.2 |
| 5,066,942 A | * | 11/1991 | Matsuo ..................... 340/568.2 |
| 5,231,375 A | * | 7/1993 | Sanders et al. ............. 340/568 |
| 5,406,260 A | * | 4/1995 | Cummings et al. ......... 340/568 |
| 5,705,976 A | * | 1/1998 | Howard .................. 340/426.34 |
| 6,021,493 A | * | 2/2000 | Cromer et al. .............. 713/200 |
| 6,154,790 A | * | 11/2000 | Pruett et al. .................. 710/15 |
| 6,172,606 B1 | * | 1/2001 | Lockyer ................... 340/568.2 |
| 6,198,391 B1 | * | 3/2001 | DeVolpi ................... 340/568.2 |
| 6,400,280 B1 | * | 6/2002 | Osakabe ................ 340/825.25 |
| 6,512,454 B2 | * | 1/2003 | Miglioli et al. ............. 340/541 |

* cited by examiner

*Primary Examiner*—Phung Nguyen

(57) ABSTRACT

Theft protection of electronic apparatuses connected to a bus system is implemented in a manner particularly suitable for use in a digital home network based on the IEEE 1394 standard. At least one of the apparatuses in the network is equipped with a monitoring unit switchable between an activated and a de-activated state. In the activated state, the monitoring unit monitors the occurrence of a bus reset which is generated particularly upon removal of an apparatus from the network. After occurrence of such a reset, the monitoring unit compares the list of all apparatuses on the bus with a list generated and stored before the reset. When determining differences, an alarm is triggered which can be reproduced particularly by means of the apparatuses which are present, such as, for example, televisions and hi-fi equipment.

10 Claims, No Drawings

METHOD AND DEVICE FOR THEFT PROTECTION OF ELECTRONIC APPARATUS CONNECTED TO A BUS SYSTEM

BACKGROUND OF THE INVENTION

1. Field of the Invention

The invention relates to a method of theft protection of electronic apparatuses connected to a bus system, wherein a signal is triggered when an apparatus is separated from the bus, on the basis of which signal the separation is recognized by the separated apparatus and/or by at least another apparatus in the bus system. The invention also relates to a device for performing said method.

2. Discussion of the Prior Art

Information processing is subjected to an increasing digitization and network connections of processing media. As far as the area of dwellings is concerned, the associated networks are denoted as digital home networks (IHDN: In-Home Digital Network). Televisions, radios, monitors, loudspeakers, cameras, printers, scanners, PCs, telephone services, speech recognition systems, domestic appliance controls, security devices and the like may be integrated in such an IHDN. Based on the usually considerable value of the electronic apparatuses connected to an IHDN, they may run the serious risk of being separated and removed from the bus system by unauthorized persons, i.e. they are stolen. Consequently, there is a need for theft protection of apparatuses connected to the bus system.

A method of theft protection of a computer (client) in a network connection to a main computer is known from U.S. Pat. No. 6,021,493 in which the main computer intermittently sends queries to the computers connected to the network and waits for a reply. In so far as no such reply is received within a predetermined period of time, the main computer assumes that the queried client has been separated from the network and thereupon triggers an alarm signal to the network administrator. This method has the drawback of a constant load of the bus system by the queries of the main computer and the confirmation replies of the computers connected thereto. In so far as this bus load is reduced by correspondingly large time intervals between the queries, the reaction time for recognizing the theft of an apparatus is detrimentally delayed thereby. A further drawback is that the method is centrally performed from the main computer so that an abusive attack on the main computer may destroy the entire security system of the network.

SUMMARY OF THE INVENTION

It is therefore an object of the present invention to provide an improved method of theft protection of electronic apparatuses, particularly for digital home networks, which, in spite of a small bus load, ensures a possibly undelayed reaction to a theft.

This object is achieved by means of a method as defined in claim 1 and by means of a device as defined in claim 10. Advantageous embodiments are defined in the dependent claims.

In the method of theft protection of electronic apparatuses connected to a bus system, a signal is triggered when such an apparatus is separated from the bus, on the basis of which signal the separation is recognized by the separated apparatus itself and/or by at least another apparatus in the bus system. After recognition of a separation, the current configuration of the bus system is compared with the previous configuration of the bus system. A condition therefor is that the bus system is adapted in such a way that the unambiguous configuration information for the relevant apparatuses should be available or obtainable. Alternatively, the configuration of the bus system to which the separated apparatus is reconnected after its separation can be compared with the previous configuration of the bus system to which the apparatus was connected before its separation. In so far as a significant difference between the previous and the current configuration is determined in one of these comparisons, a theft reaction is triggered. The bus system may be based both on a logic bus and on a physical bus.

The method according to the invention has the advantage that all checking steps are triggered by the recognized separation of an apparatus from the bus. It is therefore not necessary to continually check the further coupling of the apparatuses by way of queries. Only in such cases, in which a theft is suspected because of the separation of an apparatus, the monitoring method is used.

It is a further advantage that, in the case of a separation of an apparatus, the entire previous configuration is compared with the entire current configuration of the bus system. The configuration of the network is particularly understood to mean the number and individuality of the connected apparatuses as well as possibly the network topology. The complete comparison of the configurations has the advantage that all changes are recognized, also when they may not concern the apparatus whose separation has triggered the comparison routine.

Triggering theft reactions can be limited in the method to the determination of significant differences, i.e. differences which are above a predetermined threshold value. This threshold value may of course also be set to zero so that any configuration change triggers a theft reaction.

DETAILED DESCRIPTION OF THE PREFERRED EMBODIMENTS

In accordance with a first embodiment, the theft reaction may consist of blocking the function of the separated apparatus. When an apparatus is thus removed from a first bus system by an unauthorized person and is subsequently integrated in a second bus system, the apparatus recognizes that it was in different bus systems before and after its separation and thereupon blocks its own function. The apparatus is thereby substantially worthless. Knowledge about such a behavior of an electronic apparatus renders it uninteresting for a theft anyway and thus prevents the theft.

Alternatively or additionally, the theft reaction may also consist of triggering an alarm signal. Such an alarm signal may be triggered on the apparatus separated from the bus or preferably in apparatuses of the bus system from which the apparatus was removed. The alarm informs authorized persons of the presumably unauthorized removal of the apparatus. Moreover, the alarm may also be noticed by the unauthorized persons and disturb them in the theft process.

In this connection, the apparatuses connected to a digital home network may be advantageously used for reproducing the alarm signal. For example, connected TV apparatuses may trigger light signals, audio apparatuses may trigger sound signals and remote control alarms such as calls to an authorized person or the police may be triggered by telecommunication apparatuses. The apparatuses reproducing the alarm do not necessarily have to be monitoring apparatuses, i.e. apparatuses which can recognize the separation of an apparatus and thereupon trigger an alarm.

The bus system which is protected from theft of an electronic apparatus by the method according to the invention may be particularly a bus system based on the IEEE 1394 standard. In this standard, which is advantageously suitable for digital home networks, a reset signal is generated on the bus when an apparatus connected to the bus is separated. Furthermore, any connected electronic apparatus is given an unambiguous identification in this standard so that the configuration of a bus system once composed can unambiguously be described by means of these identifications. Moreover, the IEEE 1394 standard has the advantage of being a real peer-to-peer network which, with respect to hierarchic networks (e.g. USB) is the more appropriate topology.

In a special embodiment of the method, which is particularly suitable in connection with said IEEE 1394 standard, a reset signal is triggered on the bus when an apparatus is separated from the bus. After the reset signal, the individual identifications of all apparatuses connected to the bus are gathered in a list and then compared with a previous list in which the identifications of the apparatuses connected to the bus system before the reset signal are stored. An alarm signal is triggered when a difference between the two lists is found. The method described thus utilizes a non-specifically triggered reset signal in the case of separation of an apparatus for the purpose of detecting a change of configuration of the bus system and for subsequently reacting to this by means of an alarm.

In accordance with a further embodiment of the method described hereinbefore, the alarm signal is also triggered when the comparison between the previous and the current list cannot be terminated within a predetermined first period of time after the reset signal which occurred first, and/or when more than a predetermined number of bus resets occurs within a given unit of time. The inability of terminating the comparison of the lists may be particularly based on the fact that reset signals are repeatedly triggered in the bus system a short time after each other so that no orderly processing of the monitoring function is possible. Such repeatedly occurring reset signals may be caused abusively so as to prevent checking of the configuration change by the bus system. Such a control avoidance is then prevented by the alarm which is automatically triggered after termination of the first period of time.

In accordance with a further embodiment of the invention, the alarm signal is not triggered when at least a further reset signal is triggered within a predetermined second period of time after the first reset signal and when the list of apparatuses connected to the bus, subsequently formed after this further reset signal, corresponds to the previous list of the apparatuses connected to the bus before the first reset signal. In this way, it is ensured that only a short-lasting separation or a short-lasting drop-out of an apparatus which has nothing to do with a theft does not trigger alarm functions.

The method described above can be preferably activated and de-activated by means of authorized commands. The authorization of the commands may be given, for example, by means of a password. The user or authorized owner of the bus system may switch on monitoring functions in this way for the periods of time in which such a monitoring function is necessary. Simultaneously, he can ensure by de-activating the monitoring function that, if desired, he himself can change the configuration of the bus system.

The invention also relates to a device for theft protection of electronic apparatuses connected to the bus system, which is characterized in that at least one of the apparatuses comprises a monitoring unit coupled to the bus, which monitoring unit is connected to an alarm device and/or an apparatus control unit and is adapted to perform a method of the type described hereinbefore. This means that, particularly after the separation of an apparatus from the bus, the monitoring unit compares the configuration of the bus system before the separation and after the separation. When determining a difference between the configurations, it can then trigger an alarm via the alarm device and/or activate the apparatus control unit so as to block, for example, the functions of the apparatus. The monitoring unit may be formed as an independent apparatus connected to the bus and having the sole function of monitoring. Particularly, the monitoring unit may, however, be integrated in apparatuses which are provided anyway, such as TV apparatuses, hi-fi sets or telephones. It is particularly advantageous when a plurality of monitoring units is connected to the bus independently of each other, which monitoring units are preferably present in different rooms of a house. In this way, it can be ensured that the monitoring function cannot be switched off by unauthorized access to a single apparatus.

The invention will hereinafter be elucidated by way of an example.

A digital home network (IHDN) in which different electronic apparatuses are connected by means of an IEEE 1394 bus will be considered. A plurality of the apparatuses, for example, a television, a radio and a satellite tuner should be provided with a built-in theft protection according to the invention. These apparatuses are preferably placed in different rooms, for example the living room, the bedroom and the store room. Moreover, there may be further apparatuses such as, for example, hi-fi equipment which is also integrated in the home network but has no theft protection of its own.

After installation of all apparatuses of the digital home network, the theft protection present in several apparatuses is activated. This may be done, for example, by way of a dialogue on the television. Particularly, a password may be introduced with which the theft protection can be de-activated again so as to perform a desired change of the network at a later stage. After activation of the theft protection, any removal of an apparatus from the network triggers a theft alarm as described below.

After activation of the theft protection, the monitoring units present in the above-mentioned apparatuses first form a complete list of all identifications (GUIDs) of the apparatuses present in the network and store this list in a working memory.

In the case of an activated theft protection, the monitoring units maintain their network modules ready for operation also when the apparatus in which they are present is switched to a standby mode. Apparatuses which do not comprise any monitoring units may, however, reduce their activities in the unused state to such an extent that they have only a minimal network readiness. This particularly comprises participation in the bus reset as well as the possibility of querying CSR information (Control and Status Registers, cf. Don Anderson "Fire Wire System Architecture", 1999). Dependent on the implementation of the relevant network chip, the power supply voltage present at the IEEE 1394 bus may already be sufficient for this purpose.

When, in this state of activated theft protection, the removal of an apparatus, for example the above-mentioned hi-fi equipment, is attempted, the cable connections of the apparatus with the home network must be disconnected. At the latest when removing the IEEE 1394 cable, but possibly also already upon removal of the current cable, the apparatus or apparatuses which are adjacent to the hi-fi equipment in the topological net structure will notice the disappearance of their neighboring apparatus. In accordance with the IEEE 1394 specification, a bus reset is therefore triggered by the apparatuses in the remaining network or networks.

All IEEE 1394 controllers of the network apparatuses (or of the networks if the formerly one network is split by the removal of the hi-fi equipment) are automatically informed about the bus reset. The controllers of the monitoring units for the theft protection thereupon activate special monitoring routines which may also be realized in hardware. After ending the bus reset, these monitoring routines form a new identification list on each monitoring unit and compare it with the old list. When these two lists are different, i.e. when one list has more, fewer or different GUIDs, the alarm function of the relevant monitoring unit is activated. The alarm may be possibly delayed for several seconds so as to avoid false alarms due to controllers which sporadically disappear from the bus for a short time. The alarm may be particularly generated while using the apparatuses that are normally used elsewhere. For example, the television receiver or the hi-fi equipment may generate a disturbing sound or light in accordance with a predetermined pattern or by playing a content which is available in the IHDN (e.g. a siren alarm). The alarm may also be an automatic police call by way of a built-in modem.

The method described above also recognizes the attempt of exchanging a valuable apparatus in the network for a less valuable one. When, for example, a walkman in accordance with the IEEE 1394 standard is exchanged for the hi-fi equipment, the method according to the invention can detect this because each apparatus has globally unambiguous identifiers in the GUIDs.

Furthermore, it can be attempted to eliminate the monitoring function by triggering a rapid succession of bus resets by means of a bus reset generator. Since a new bus reset comes before the previous one was completely treated by the bus system, there is the risk that the monitoring units are no longer capable of querying the apparatuses which are still present in the network. According to the invention, this risk is eliminated in that the monitoring units have a limit value for the number of bus resets which may occur within a given time unit. Dependent on the stability of the network, this value may be variable. When this value is exceeded, the monitoring units trigger an alarm so that the blocking attempt of the theft protection, performed with a reset generator, has failed.

In accordance with another embodiment of the invention, the comparison of configurations of the networks is utilized to prevent an apparatus removed by unauthorized persons from being further used. After activation of such a protection function, the monitoring unit of the corresponding apparatus again forms a list of all identifications (GUIDs) of the apparatuses present in the network and stores this list permanently on a non-volatile non-erasable memory that cannot be easily removed. This may be, for example, a flash RAM area on the IEEE 1394 controller chip. After removal of such an apparatus from the network and the renewed connection to another network, the apparatus, when switched on, recognizes that the protection mode for further use has been activated. Upon switch-on, the controller then forms a list of the identifications in the network and compares it with the stored list. When the two lists differ by more than a predetermined percentage (including zero percent), the controller will refuse to operate. The stolen apparatus will thus become effectively worthless and therefore uninteresting anyway for a theft.

A theft protection for all apparatuses connected to a bus in accordance with the IEEE 1394 standard is thus ensured without any additional sensors and without any additional cables by means of the method according to the invention. Theft is particularly difficult when either the central apparatus is safely built in or when a plurality of apparatuses in the house have incorporated corresponding monitoring devices. The method according to the invention can be implemented by corresponding extensions in the IEEE 1394 controller as well as by the driver and application software of the apparatuses concerned. The process of monitoring the theft protection is further explicitly activated and de-activated by the user, for example, by a hidden physical device on the apparatus or by a password, code number or application program protected in a similar manner. When the monitoring is switched off, the apparatuses can be removed without triggering an alarm and without activating the protection of their further use when they are switched on again.

All apparatuses to be monitored are preferably powered by their own network part so as to prevent a drop-out of the monitoring process by separating the apparatus from the power supply based on the IEEE 1394 standard. All other apparatuses can switch off their own power supply as long as there is enough current available in the IEEE 1394 network to perform the communication functions of all apparatuses so that they can further take part in the bus resets and can read their CSR information can be read. It is also advantageous if the apparatuses to be monitored can activate other apparatuses in the alarm case so as to increase the generation of sound and light.

The certainty and probability of a false alarm can be controlled in dependence upon the waiting time of the monitoring units after a bus reset which incorporates the apparatus in the network again.

When there is a bus manager in the network, the number and local identifications of the apparatuses can be queried from the bus manager. By means of the local identifications, the global unambiguous identification (GUID) of each apparatus can then be queried. These GUIDs constitute the list of the apparatuses that are present. However, if there is no bus manager in the network, a monitoring apparatus triggers a bus reset a randomly selected period of time after the monitoring function is switched on. This is no longer necessary at later tests, triggered by bus resets, of the connected apparatuses. All monitoring apparatuses observe the bus after the reset on self-ID packets. The number of these packets corresponds to the number of apparatuses in the network and the transferred IDs can be used for obtaining the GUIDs of the apparatuses in order that the GUID-list can be formed.

What is claimed is:

1. A method of theft protection of electronic apparatuses connected to a bus system, said method comprising the steps of:

triggering a signal when an apparatus is separated from the bus system, wherein the separation is recognized by the separated apparatus and/or by at least another apparatus in the bus system, comparing the current configuration of the bus system after recognition of the separation and the configuration of that bus system to which the separated apparatus is reconnected after its separation with the previous configuration of the bus system prior to the separation, and triggering a theft reaction when a significant difference is found between said configurations.

2. The method as claimed in claim 1, wherein the theft reaction consists of blocking the function of the apparatus.

3. A method as claimed in claim 1, wherein the theft reaction consists of triggering an alarm signal.

4. The method as claimed in claim 3, wherein the alarm signal is reproduced by means of apparatuses connected to the bus, selected from the group consisting of: television apparatuses, audio apparatuses and telecommunication apparatuses.

5. The method as claimed in claim 1, wherein the bus system is controlled in accordance with an IEEE 1394 standard.

6. The method as claimed in claim 1, wherein the separation of an apparatus from the bus further comprising the step of:

triggering a reset signal on the bus, wherein individual identifications of all apparatuses connected to the bus are gathered in a list after the reset signal and compared with a previous list in which the identifications of the apparatuses connected to the bus are stored before the reset signal, and in that an alarm signal is triggered when the two lists are different.

7. The method as claimed in claim 6, wherein the alarm signal is also triggered when the comparison of the lists cannot be terminated after a predetermined first period of time after the first reset signal and/or when more than a predetermined number of reset signals occurs within a given unit of time.

8. The method as claimed in claim 6, wherein the alarm signal is not triggered when at least a further reset signal is triggered within a predetermined second period of time after the first reset signal, and when the subsequently formed list of the apparatuses connected to the bus corresponds to the previous list.

9. The method as claimed in claim 1, wherein the method can be activated and de-activated by means of authorized commands.

10. A device for theft protection of electronic apparatuses connected to a bus system, comprising:

a monitoring unit coupled to the bus, the monitoring unit is connected to art alarm device and/or an apparatus control the monitoring unit comprising:

means for triggering a signal when an apparatus is separated from the bus system, wherein the separation is recognized by the separated apparatus and/or by at least another apparatus in the bus system, means for comparing the current configuration of the bus system after recognition of the separation and the configuration of that bus system to which the separated apparatus is reconnected after its separation with the previous configuration of the bus system prior to the separation, and means for triggering a theft reaction when a significant difference is found between said configurations.

* * * * *